United States Patent [19]
du Plessis

[11] Patent Number: 5,406,582
[45] Date of Patent: Apr. 11, 1995

[54] APPARATUS AND PROCESS FOR ACTIVATION AND REACTIVATION OF CARBON BY ELECTRICAL RESISTANCE HEATING IN THE PRESENCE OF STEAM

[76] Inventor: Cornelius du Plessis, 180 Dover Furnace Rd., Dover Plains, N.Y. 12522

[21] Appl. No.: 101,567
[22] Filed: Aug. 3, 1993
[51] Int. Cl.⁶ .................................................. F27D 3/00
[52] U.S. Cl. ......................................... 373/115; 373/109; 373/136; 502/5
[58] Field of Search ............... 373/109, 111, 114, 115, 373/118–120, 122, 123, 135, 136, 34; 202/19, 27; 502/5, 55

[56] References Cited
U.S. PATENT DOCUMENTS

| | | | |
|---|---|---|---|
| 896,413 | 8/1908 | Reid | 373/80 |
| 4,192,962 | 3/1980 | Nakao et al. | 373/115 |
| 5,089,457 | 2/1992 | Gayland et al. | 502/5 |
| 5,173,921 | 12/1992 | Gayland et al. | 373/115 |
| 5,190,901 | 3/1993 | Hirai | 502/5 |

Primary Examiner—Bruce A. Reynolds
Assistant Examiner—Tu Hoang

[57] ABSTRACT

An apparatus and process for the activation or reactivation of carbon in a tubular reactor that consists of two or more sequential sections, each section containing a descending column of carbon, with inlets to introduce steam into any one or more of the sections, and wherein the electric current is fed into the column of carbon of each such section via a graphite block serving as an electrode and positioned at the center of the top of the column by attachment to a steel plate that includes a flat or a V-shaped shelf and that is provided with openings to allow the released gases and vapors to escape.

6 Claims, 2 Drawing Sheets

APPARATUS AND PROCESS FOR ACTIVATION AND REACTIVATION OF CARBON BY ELECTRICAL RESISTANCE HEATING IN THE PRESENCE OF STEAM

BACKGROUND OF THE INVENTION

1. Field of the Invention

This invention relates to an apparatus and process for the activation and reactivation of carbon by electrical resistance heating in the presence of steam. It particularly relates to an improved apparatus in which both the electric current and the steam are more uniformly distributed through the carbon, and in which the paths of both the electric current and the steam flow can be selected so as to achieve optimal flexibility in the operation of the apparatus.

2. Description of the Related Art

The use of electrical resistance heating for the activation and reactivation of carbon in the presence of steam has been described in U.S. Pat. Nos. 5,089,457, and 5,173,921. In the processes described therein, the carbon to be activated or reactivated descends by gravity through a tubular reactor, while steam is fed into the bottom of the reactor and moves upward in opposition to the descending carbon. The steam can undergo any or all of a number of possible reactions:

1. In carbon activation, the steam and carbon are converted to carbon monoxide and hydrogen, according to the equation $$H_2O_{gas} + C_{solid} \rightarrow CO_{gas} + H_{2gas}$$

2. Some of the steam can react further with carbon monoxide in the "water gas shift reaction."

$$H_2O_{gas} + CO_{gas} \rightarrow CO_{2gas} + H_{2gas}$$

3. The steam also serves to desorb other matter that is already adsorbed on spent activated carbons.
4. The steam can react with some adsorbates on spent carbons, as for example in the hydrolysis of adsorbed fatty esters.

Other gases can also be used to activate carbon. A useful example is carbon dioxide, which reacts with carbon according to the following equation:

$$CO_{2gas} + C_{solid} \rightarrow 2CO_{gas}$$

In carbon activation, reactions 1 and 2 consume steam, so that the activation process is slowed down in the upper portions of the tubular reactor, or else an excess of steam must be provided in the initial injection to make up for such consumption. Such excess seriously compromises the controls needed to establish proper reaction temperatures for activation. In carbon reactivation, the desorbed vapors from reactions 3 and 4 may recondense in the upper portions of the reactor, thereby offering increased resistance to gas flow ("back pressure") and unfavorably affecting the temperature and current distributions in the reactor. Also, if all the steam needed for its various functions is introduced at one point at the bottom of the reactor, then its rate of introduction must be limited so as not to reach a linear speed that would impose too great a pressure on the carbon or require too high a reactor temperature. These limitations necessarily slow down the activation or reactivation processes. Another disadvantage of rapid steam introduction is the possibility of lifting or incipient fluidizing of the carbon bed, resulting in arcing of the electric current between carbon particles. Another disadvantage of rapid steam introduction into carbon particles that are heated by electrical resistance is the tendency for separation of the carbon particles at the injection points with consequent electrical arcing and burning of the steam injector tips. Still another major disadvantage is the fact that excessive steam flow beyond what is needed in a particular section of the reactor may have an adverse effect on the temperature profile in the reactor. In summary, the introduction at one point in the reactor of the total steam flow needed for all requirements in the reactor severely limits the options for operating controls in the activation or reactivation processes by electrical resistance heating.

It is accordingly an object of this invention to provide an improved apparatus for the activation of carbon feedstocks or the reactivation of spent activated carbon by electrical resistance heating in the presence of an activating gas.

It is another object of this invention to provide such improvement when the activating gas is steam or carbon dioxide.

It is another object of this invention to limit the introduction of steam to any section of the reactor to the amount of steam needed for the processes occurring in that section, and to allow the gaseous reaction products or the desorbed gases and vapors to escape from the section of the reactor where they are produced.

It is another object of this invention to inject the steam into the carbon by a means that will distribute the steam uniformly through the carbon particles and prevent electrical arcing and consequent burning at the steam injector points.

It is yet another object of this invention to provide that the electric current is distributed uniformly through the carbon being activated or reactivated in each section of the reactor.

SUMMARY OF THE INVENTION

Briefly, the objects of this invention are achieved by improvements in an apparatus and in a process that utilize a feed hopper from which the carbon feedstock or spent activated carbon (hereinafter, the term carbon feedstock will include spent activated carbon) enters by gravity into a tubular reactor of refractory material, whose top is joined to the bottom of the feed hopper, and whose bottom is joined to a valve or other device for removal of the activated or reactivated carbon product, an electrical terminal on the outside of the feed hopper and another terminal at the bottom of the reactor, said terminals being connected to a source of electric current, the current passing between the terminals through the descending carbon particles. The improvements in the apparatus comprise a reactor that consists of two or more sequential sections, each section containing a descending column of carbon feedstock, with the means to introduce steam into each of said sections via an inlet through which the steam enters into a steam jacket provided with orifices that inject the steam at more than one distance from the central axis of the carbon column, and wherein the electric current is fed into the column of descending carbon feedstock in each such section via a graphite block serving as an electrode and positioned at the center of the top of the said column by attachment to a steel plate that includes a flat or a V-shaped shelf and that is provided with openings to allow the released gases and vapors to escape. The improvement in the process comprises introducing steam into at least one section of the reactor. Each steam jacket assembly, together with its adjacent portion of the tubular reactor, also serves as a heat exchanger, whereby the hot carbon gives up some of its heat to the incoming steam and thereby superheats it.

If a plurality of such sections is set up, and the number of such sections is in excess of that which is needed to activate or reactivate the carbon satisfactorily, the path of the electric current may be selected so as to pass through only the lowermost one or more of said sections as needed. The choice of whether or not to introduce steam into any given section is also optional and is independent of the selected path of the electric current. The shape of the graphite block is not critical. For example, it may be in the form of a portion of a rod or a tube of rectangular, circular, or other cross section. Its size relative to the cross-sectional area of the space it occupies should be large enough to provide sufficient surface area to distribute the current effectively to the carbon particles that flow past it, but not so large that it impedes the flow of said particles. For example, the cross sectional area of the block projected to the horizontal plane may range from about ¼ or less of cross sectional area of the opening in which it is placed to about ¾ or even more of such area, if the carbon granules can flow effectively around it. The major advantages offered by this invention include the provision for the introduction of steam specifically into the section or sections where it is needed and to allow the prompt escape of the various gases from the system in a single stage or a plurality of stages, with the simultaneous provision of greatly improved current distribution through the carbon via the graphite block or blocks, and the provision of flexibility by the opportunity to select the desired number of steam-injection stages and the path of the electric current consistent with the requirements of the carbon to be activated or reactivated.

DESCRIPTION OF THE PREFERRED EMBODIMENTS

Figure 1:
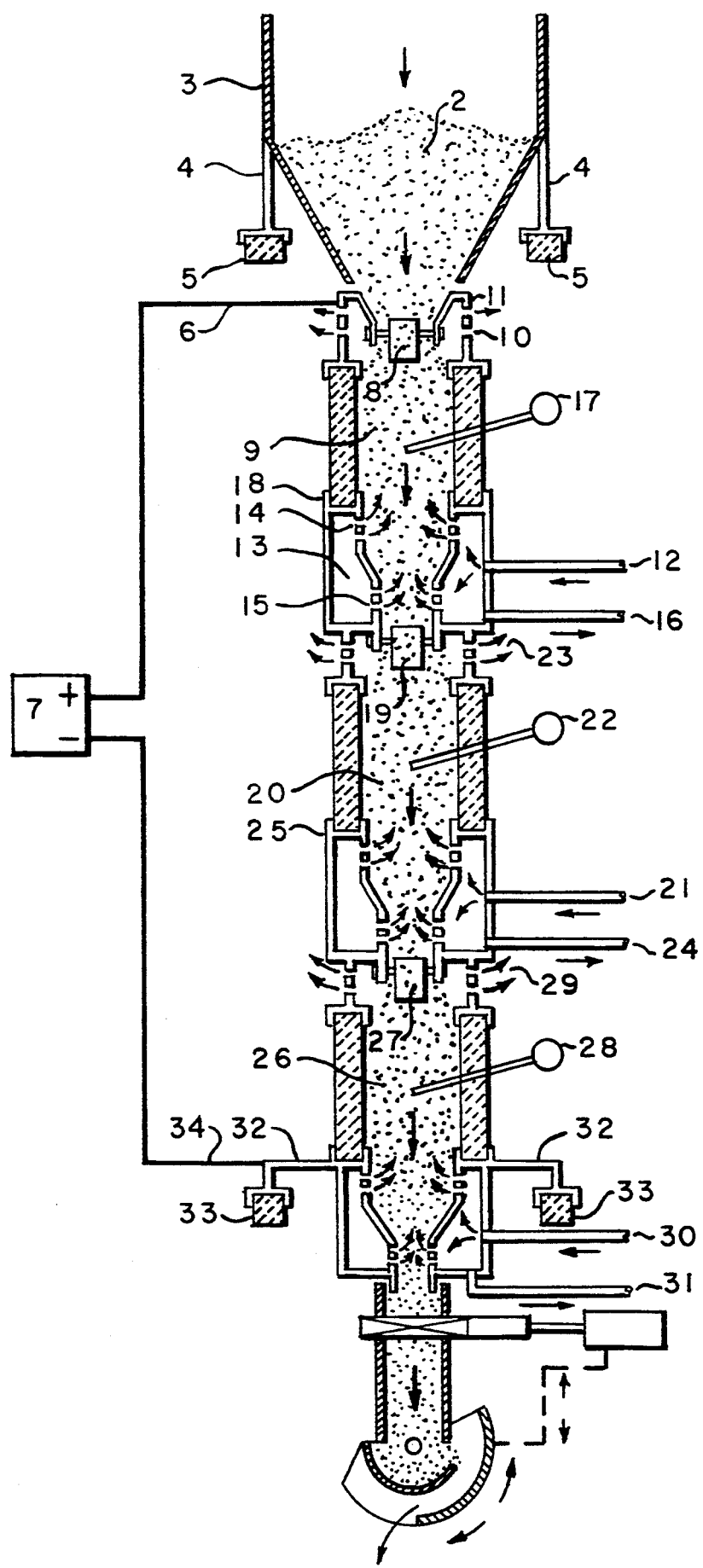
FIG. 1 shows an apparatus for use in the activation or reactivation of carbon by electrical resistance heating according to the process of the present invention.
Figure 2:
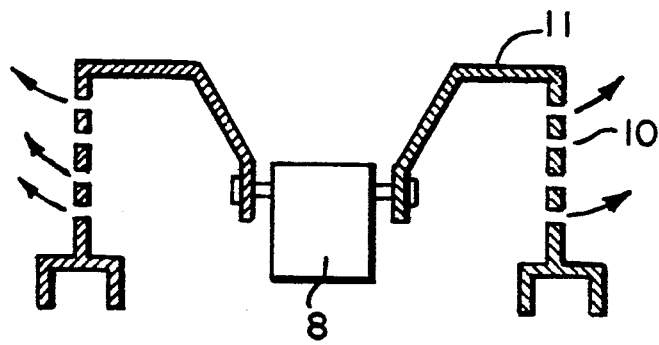
FIG. 2 shows a detail of one of the sections of steel plate of FIG. 1 with its graphite block and slotted openings.
Figure 3:
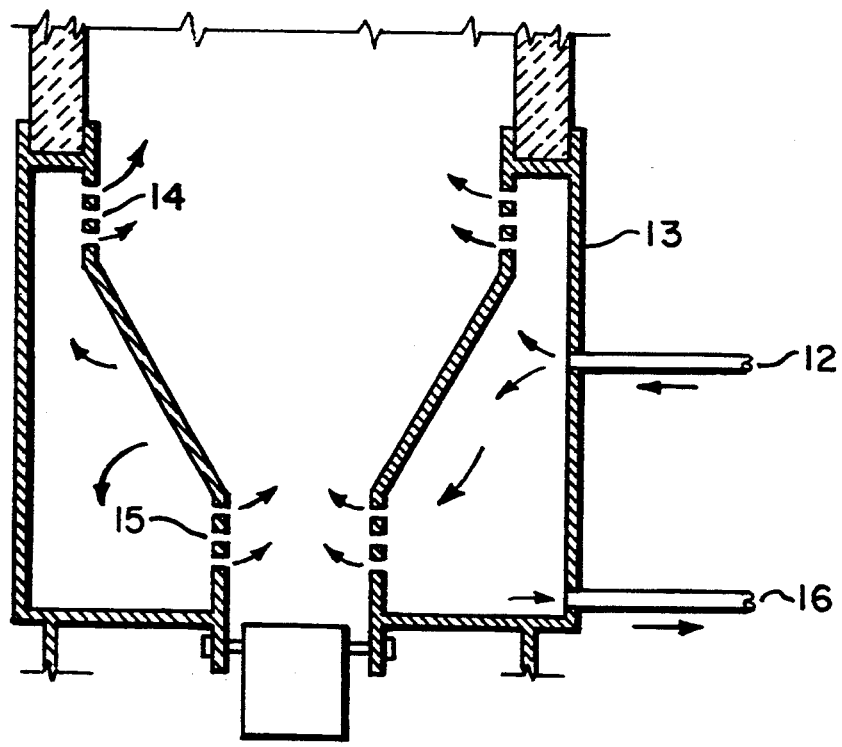
FIG. 3 shows a detail of one of the steam jackets with its steam inlet, its upper and lower steam orifices, and drain for any steam condensate.

In the preferred embodiments, the carbon feedstock is fed into one to three steam-injection stages, as will be made clearer by referring to the accompanying drawings in FIGS. 1, 2, and 3, which are partly diagrammatic and partly vertical sections of the apparatus 1. The carbon feedstock 2 is loaded into a steel feed hopper 3, which is electrically isolated from its supports 4 by insulators 5. The feed hopper is attached to electrical terminal 6 which is fed by a DC or AC power supply 7. The carbon moves by gravity around and past graphite block 8 into the first section 9. The emitted gases escape through slotted openings 10 in plate 11. Steam is injected into this section via tube 12 into steam jacket 13, which is provided with two sets of orifices, an upper set 14 and a lower set 15, shown in detail in FIG. 3. Any steam condensate is drained out through tube 16. The effect of this arrangement of steam jacket with multiple orifices at different distances from the central axis of the carbon column is to distribute the steam more uniformly through the descending carbon column, to facilitate the use of low pressure steam at temperatures not far above 100° C. which is then rapidly superheated by the hot carbon. This heat exchange arrangement also modulates the temperature of the carbon and serves as an auxiliary means of controlling the carbon temperature. Also, the arrangement prevents electrical arcing and consequent burning at the steam injector points. It will be obvious that the same results of uniformity of steam distribution and prevention of burning of steam injector tips can be obtained by various arrangements of multiple steam orifices that embody the principles herein described. The temperature of the carbon in section 9 is measured by thermocouple 17. The partially activated or reactivated carbon continues to flow by gravity through steel plate 18 around and past the second graphite block 19 into the second section 20, which is similarly provided with steam inlet 21, thermocouple 22, escape openings 23, and steam condensate drain 24. A similar arrangement leads through plate 25 to the third section 26, similarly provided as in the first and second sections with graphite block 27, thermocouple 28, slotted openings 29, steam inlet 30, and steam condensate drain 31. In the event that two sections are sufficient to activate or reactivate the carbon to the degree necessary, the terminal 6 can be moved down so that the current enters via plate 18, leaving the upper section without current and serving merely as a continuation or extension of the feed hopper. Similarly, if only one drying chamber is sufficient, terminal 6 can be moved down to plate 25. Alternatively, the apparatus can be constructed with only two reaction sections. On the other hand, if more than three reaction sections are needed, the apparatus can be constructed to include any required number of such sections, as is evident from the description of this invention. The bottom support 32 of the apparatus, which is electrically isolated by insulators 33, is connected to the other terminal 34 of the electrical power supply. The discharge of the apparatus can be fed into a receiving storage container, such as a steel drum.

My invention will be made clearer by the following examples. These examples are given for illustration only, and are not considered to be limiting.

EXAMPLE 1

A charge of coconut shell char, which constitutes a feedstock for the production of activated carbon, was introduced into the feed hopper 3. The temperatures in the three reaction sections 9, 20, and 26 shown in the drawing were kept at 800° to 900° C., and steam was injected into inlets 12, 21, and 30. As the carbon progressed through the apparatus, it was found that the Iodine Number (A.S.T.M. Standard Test Method D 4607) ranged from 1000 to 1200, and that the Carbon Tetrachloride Activity (A.S.T.M. Standard Test Method D 3467) ranged from 60 to 65. These values are characteristic of a highly activated carbon, suitable for a wide diversity of commercial applications. The coconut char feedstock throughput was then continued while the terminal 6 was moved down so that the current passed only through reaction sections 20 and 26. Steam was injected only into inlets 21 and 30. It was then found that the Iodine Number of the finished product was about 750 and the Carbon Tetrachloride Activity was about 50. These values are typical of a good but not highly activated carbon, suitable for some commercial applications. Terminal 6 was again moved down, while the coconut char throughput continued, so that the current passed only through reaction section 26, and steam was injected only into inlet 30. It was then found that the Iodine Number of the received product was about 450 and the Carbon Tetrachloride Activity was about 35. These values are too low to be generally acceptable for most commercial applications. Steam was then injected into inlets 21 and 30 while terminal 6 was left in position so that the current continued to pass only through section 26. It was then found that the Iodine Number of the received product was about 550 and the Carbon Tetrachloride Activity was about 45. These values are also too low to be generally acceptable for most commercial applications. Accordingly, the terminal 6 was returned to the upper contact so the current passed through all the reaction sections and steam was injected into all the inlets so as to yield a highly activated product. If a good but not highly activated carbon would have been acceptable, the terminal 6 could have been placed in the intermediate position so that the current passed only through reaction sections 20 and 26, with steam injection into inlets 21 and 30.

EXAMPLE 2

A charge of a petroleum coke activated carbon that had been exhausted (saturated) by exposure to gasoline vapors was introduced into the feed hopper 3. The temperatures in the three reaction sections 9, 20, and 26 shown in the drawing were kept at 800° to 900° C., and steam was injected into inlets 12, 21, and 30. As the carbon progressed through the apparatus, it was found that the Iodine Number (A.S.T.M. Standard Test Method D 4607) ranged from 1000 to 1200, and that the Carbon Tetrachloride Activity (A.S.T.M. Standard Test Method D 3467) ranged from 60 to 65. These values are characteristic of a highly activated carbon, suitable for a wide diversity of commercial applications. The exhausted activated carbon feedstock throughput was now continued while the terminal 6 was moved down so that the current passed only through reaction sections 20 and 26. Steam was injected only into inlets 21 and 30. It was then found that the Iodine Number of the received product still remained in the range of 1000 to 1200 and the Carbon Tetrachloride Activity remained at about 60 to 65. Terminal 6 was again moved down, while the exhausted carbon throughput continued, so that the current passed only through reaction section 26. Steam was injected only into inlet 30. It was then found that the Iodine Number of the received product ranged from about 750 to 900 and the Carbon Tetrachloride Activity ranged from 45 to 55. These values are too low to be acceptable for most commercial applications. Steam was then injected into inlets 21 and 30 while terminal 6 was left in position so that the current continued to pass only through section 26. It was then found that the Iodine Number of the received product ranged from 900 to 1000 and the Carbon Tetrachloride Activity ranged from 55 to 60. These values are acceptable for many commercial applications. Accordingly, for such applications, the terminal 6 was left at the lower contact so the current passed only through the lowest reaction section, with steam injection into inlets 21 and 30. If a highly activated product would have been required, the terminal could have been placed in the intermediate position so that the current passed only through reaction sections 20 and 26, with steam injections into inlets 21 and 30.

I claim:

1. In an apparatus for the activation of a carbon feedstock or the reactivation of spent carbon feedstock by electrical resistance heating in the presence of steam that comprises a feed hopper from which the carbon feedstock enters by gravity into a tubular reactor of refractory material to form a descending column of carbon feedstock, wherein the top of the reactor is joined to the bottom of the feed hopper, and wherein the bottom of the reactor is joined to a valve for removal of the activated carbon product, an electrical terminal on the outside of the feed hopper and another terminal affixed at the bottom of the reactor, said terminals being connected to a source of electric current, the current passing between the terminals through the descending carbon feedstocks, the improvements wherein the reactor consists of two or more sequential sections, each section containing a moving column of carbon feedstock, with inlets to introduce steam into any of said sections in sequence, and wherein the electric current is fed into the moving column of carbon feedstock of each section via a graphite block serving as an electrode and positioned at the center of the top of the said column by attachment to a steel plate that includes a shelf and that is provided with openings to allow the emitted gases and vapors to escape.

2. An apparatus according to claim 1 wherein the steam is introduced into a steam jacket that is provided with multiple orifices so that steam is injected from the steam jacket into the reactor at different distances from the central axis of the column of carbon feedstock.

3. An apparatus according to claim 1 wherein the number of sections is 3 or 4.

4. An apparatus according to claim 1 wherein the path of the electric current is selected so as to pass through only the lowermost one of said sections.

5. An apparatus according to claim 1 wherein the shelf is flat.

6. An apparatus according to claim 1 wherein the shelf is V-shaped.

* * * * *